Oct. 11, 1938.                R. CHILTON                2,132,605
                              CYLINDER HEAD
              Filed Nov. 29, 1935              3 Sheets-Sheet 1
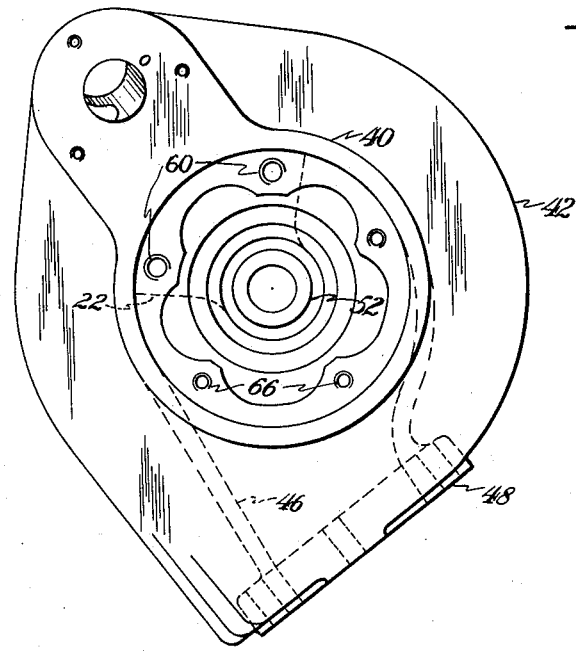
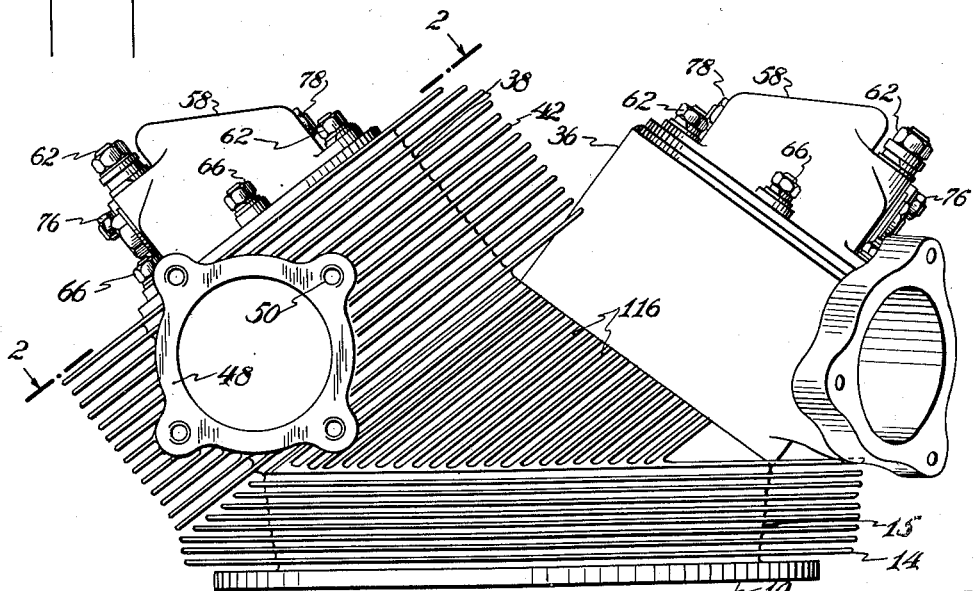
INVENTOR.
ROLAND CHILTON
BY
ATTORNEY.

Oct. 11, 1938.   R. CHILTON   2,132,605
CYLINDER HEAD
Filed Nov. 29, 1935   3 Sheets-Sheet 2
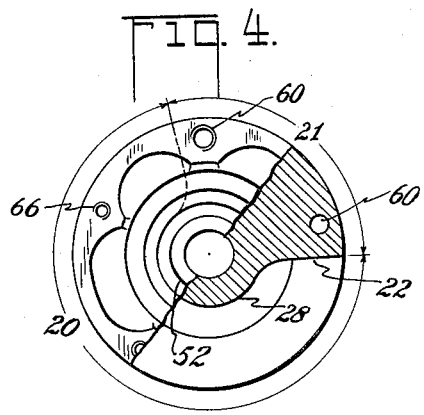
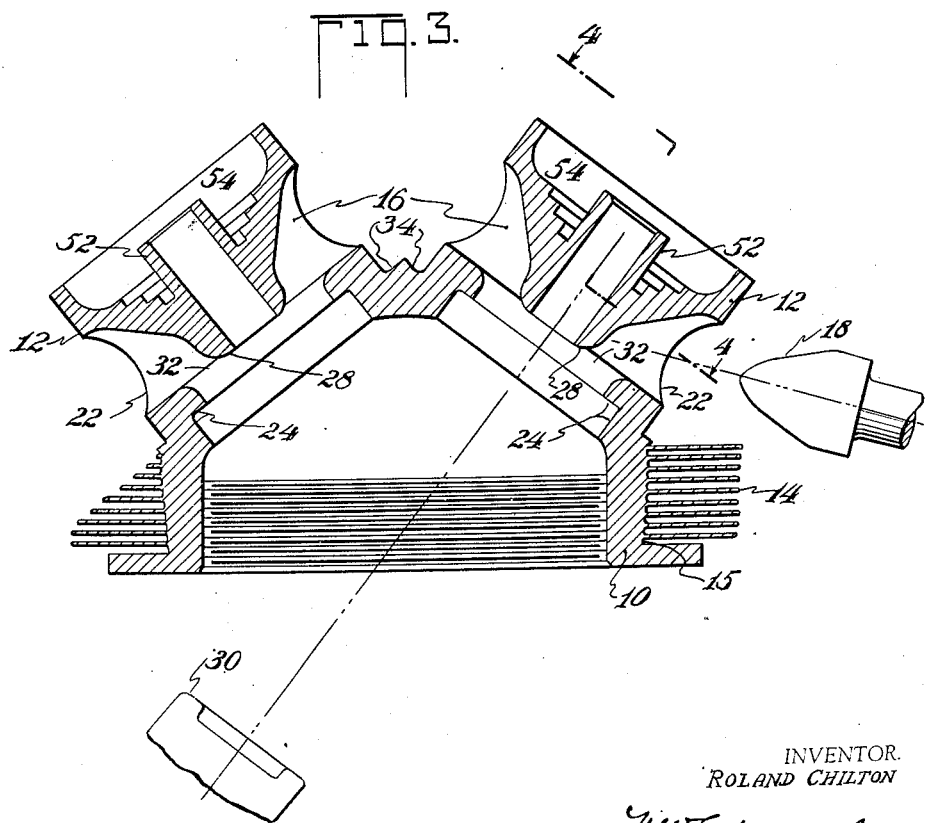
INVENTOR.
ROLAND CHILTON
BY
ATTORNEY.

Oct. 11, 1938.   R. CHILTON   2,132,605
CYLINDER HEAD
Filed Nov. 29, 1935   3 Sheets-Sheet 3
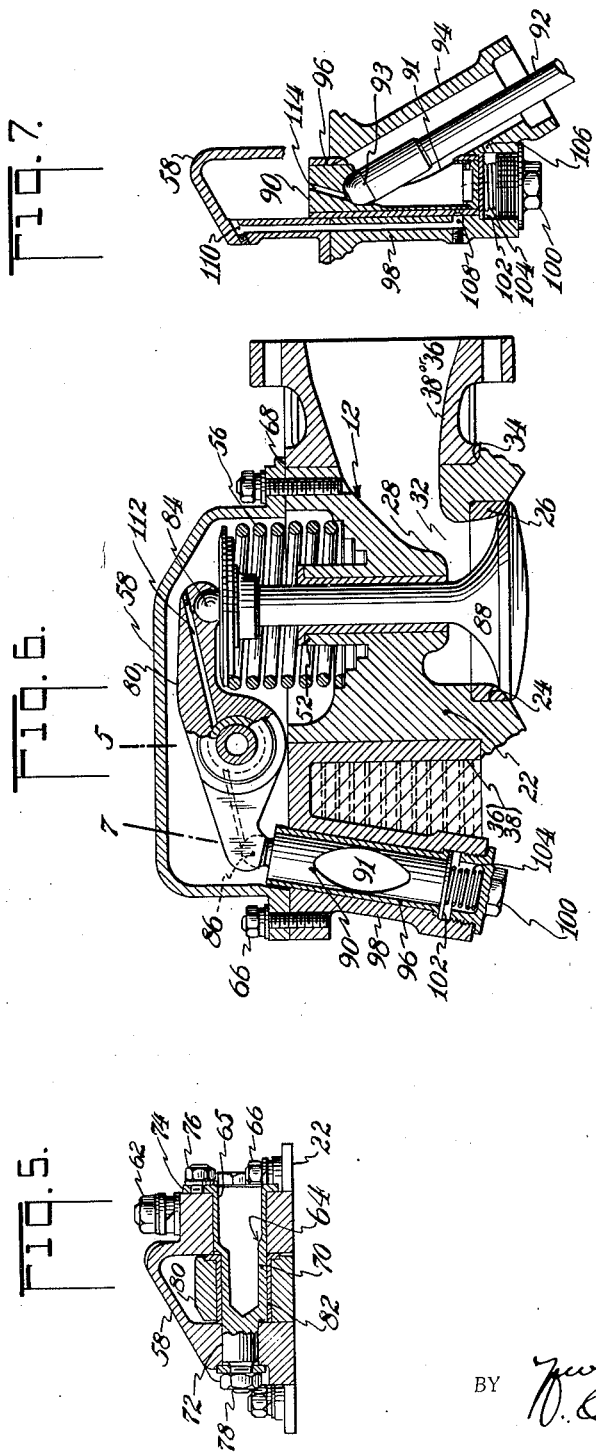
INVENTOR.
ROLAND CHILTON
BY
ATTORNEY.

Patented Oct. 11, 1938

2,132,605

UNITED STATES PATENT OFFICE 2,132,605

CYLINDER HEAD

Roland Chilton, Ridgewood, N. J., assignor, by mesne assignments, to Wright Aeronautical Corporation, Paterson, N. J., a corporation of New York Application November 29, 1935, Serial No. 52,029

12 Claims. (Cl. 123—170)

This invention relates to engine cylinder heads in general, and specifically to an improved construction for air-cooled aircraft engine cylinder heads and valve gear.

A prime object of the invention is to provide novel structure whereby the main stressed part of the head may be made from an integral forging and whereby the machining necessary to produce the necessary fin and port elements is reduced to a few simple operations, whereby the advantages of the increased strength and reliability of the forged material are realized at minimum cost, as compared to the conventional constructions patterned after designs originally adapted for casting. Other objects and advantages will be obvious from or will be pointed out in the following description with reference to the drawings, in which:

Fig. 1 is a rear outside view of the cylinder head;

Fig. 2 is a plan view of one of the port pieces;

Fig. 3 is an axial section through the main forged head piece;

Fig. 4 is a fragmentary plan view of one of the head port projections in part section on the line 4 of Fig. 3;

Fig. 5 is a section through a rocker box on the line 5 of Fig. 6;

Fig. 6 is a fragmentary section on the axis of one of the valves; and

Fig. 7 is a fragmentary section on the line 7 of Fig. 6.

Referring first to Fig. 3, which comprises a section through the plane of the valves showing only the main head forging in machined condition, 10 designates a generally hemispherical wall of the head equipped with two integral cylindrical extensions indicated in general at 12, these being disposed concentric to the axis of the respective valves to be inserted therein and diverging from the head axis. Circumferential fins 14 are based on a lower circular portion 15 of the head and may be produced by a simple turning operation; lower arcuate ports 16 are produced by means of a cutter such as indicated at 18, the cylinder head being rotated relative to the cutter about the valve axis to remove material through an angle 20 (Fig. 4), leaving a solid portion subtending the angle 21 which solid portion is also indicated by the reference numeral 22 in the axial section of Fig. 6. The inner part of the port, which opens into the cylinder head, including the bore and shoulder 24 for a valve seat 26 (Fig. 6), together with the opening around the lower end of the valve guide portion 28 is produced by a hollow-ended cutter as indicated at 30 (Fig. 3) which is moved axially toward each extension 12; the paths of movement of the cutters 18 and 30 overlapping to remove all the material to create the annular, segmental port indicated as a whole at 32.

The exterior diameters of the extensions 12 are turned down to shoulders 34 and around them there are shrunk on port belts, which may be castings, of which the inlet member is indicated in Fig. 1 at 36 and the exhaust at 38 and again, in plan view, in Fig. 2. The exhaust belt 38 comprises the cylindrical part 40 (Fig. 2) having fins 42 and provided with a port 46 terminating at a flange 48 having stud openings 50 (Fig. 1) for securing an exhaust pipe in the usual way. It will be understood that the port outlet 46, 48 is opposite to the solid portion 22 of the extension 12 (see Fig. 2), and this massive solid portion ties in the upper part of the port extension 12 which contains an integral valve guide boss 28, the upper projecting portion 52 of which is produced by a simple turning operation to remove the material indicated at 54 (Fig. 3), for the accommodation of valve springs, the outer one of which is shown at 56 (Fig. 6). The inlet port belt 36 is arranged similarly to the exhaust port belt 38, but no fins need be provided thereon.

The valve mechanism, now to be described, is similar for both exhaust and intake organizations. In the upper face of the integral extension 12 there are tapped a number of holes 60 for studs to secure a rocker box cover 58. Two of these holes are larger than the others to accommodate studs 62 which are close to a rocker arm fulcrum pin 64 and therefore subject to the valve operating loads. It is an important provision of this invention that the fulcrum pin stud 62 engage the holes 60 formed in the massive solid portion 22 integral with the head portion whereby the valve operating stresses are directly carried into the main material of the forged head itself. Subsidiary studs 66 are provided to ensure oil tightness of the rocker box cover 58 which, however, preferably overhangs the port belt 38 as indicated at 68 (Fig. 6), whereby the port belt is positively held down against the shoulder 34. The fulcrum pin 64 has its intermediate portion 70 (Fig. 5) formed eccentric with respect to the concentric large end 65 and smaller end 72. The large end 65 is provided with an arcuate flange 74 engaged by a clamping stud 76. The fulcrum pin is additionally secured by a nut 78 and, by slacking off this and the clamp nut 76, the pin may be rotated to adjust the rocker arm 80 which is supported on a bushing 82 engaging the eccentric portion 70 of the fulcrum pin, for valve clearance adjustment. This enables adjustment of valve clearance without removal of rocker box covers and the like, by turning the eccentric until the rocker ends abut the valve and guide plunger, and then backing off the eccentric the prescribed angular amount.

By means of flatted balls 84, 86 the ends of the rocker arm engage a conventional valve 88 and a guide plunger 90. This plunger (see Fig. 7) has a lateral opening 91, spherically ended to engage the ball end 93 of a conventional push rod 92 surrounded by a boss 94 integral with the belt 38 which may engage a conventional tubular push rod housing (not shown). This plunger 90 reciprocates in a bushing 96 in a boss 98 of the port belt member 38 and serves to relieve the rocker arm bearing bushing 82 of the side reactions due to the angular disposition of the push rod 92. The plunger further acts as a pump as follows: The lower end of the boss 98 is sealed by a screw plug 100, and a disc valve 102 is normally seated against the end of the bushing 96 by a spring 104 to comprise a scavenging valve communicating with the interior of the push rod housing boss 94 by means of the hole 106 (Fig. 7). In the boss 98 there is formed a passage 108 communicating with the interior of the rocker box cover 58 at 110 and this passage or port 108 is uncovered by the lower end of the plunger 90 towards the upper end of its travel, whereat a vacuum is formed beneath the plunger which will draw in oil or vapor from the rocker box cover 58 which will be delivered to the push rod housing through the hole 106 on the down stroke of the plunger. Oil may be fed to a lubrication hole 112 (Fig. 6) in the rocker arm 80 by any suitable connections, as by external pipes (not shown) to the fulcrum pin 64, or by being forced up the push rod 92 from the engine, through a hole 114 in the plunger 90, thence through a mating hole in the ball 86 to the rocker arm bore 112, whence the rocker arm bearing, the balls 84 and 86 and the valve spring seats are lubricated. Surplus oil is scavenged as above described, the scavenged oil returning from the port 106 to the push rod housing.

Angular fins 116 are milled into the main forged head portion as indicated in Fig. 1. The upper end of these fins projects from beyond the inlet port belt 36 and suitable baffles (not shown) may be provided to conduct cooling air to these projecting ends.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. A cylinder head including an integral cylindrical extension, an arcuate port opening formed in said extension, and an annular port member shrunk around said extension communicating with said opening.

2. A forged cylinder head comprising a wall, a cylindrical portion extending integrally from said wall, said portion having an arcuate port formed therein, a valve spring seat formed in said extension and defining with said port a valve guide boss integrally connected with said head by material defined between the ends of said arcuate port, and an annular member comprising a lateral continuation of said port, embracing and shrunk around said extension.

3. The combination with a cylinder head having a valve opening, of an integral cylindrical projection concentric with said opening provided with an arcuate port communicating therewith and defining a valve guide boss, a mass of material integrally connecting said boss and said wall, and a finned port belt concentric with and shrunk upon said extension.

4. The combination with a cylinder head having a valve opening, of an integral cylindrical projection concentric with said opening provided with an arcuate port communicating therewith and defining a valve guide boss, a mass of material integrally connecting said boss and said wall, valve operating mechanism secured to said material, and a finned port belt concentric with and shrunk upon said extension.

5. The combination with a cylinder head having a wall and a cylindrical extension integral therewith, of a port belt assembled in intimate thermal contact with said extension, and a rocker box cover secured to said extension and overlapping said port belt to additionally secure the belt axially.

6. A cylinder head comprising a wall having fins thereon, a cylindrical extension integral with the wall, said extension having an arcuate port formed throughout a major part of the periphery thereof and having a central bore establishing communication between the port and the cylinder, and a belt member having a bore within which said extension is in fitted engagement, and having a lateral opening communicating with said arcuate port.

7. A cylinder head comprising a wall having fins thereon, a cylindrical extension integral with the wall, said extension having an arcuate port formed throughout a major part of the periphery thereof and having a central bore establishing communication between the port and the cylinder, a belt member having a bore within which said extension is in fitted engagement, and having a lateral opening communicating with said arcuate port, and valve mechanism attached to said extension and overlapping the belt member for holding the latter in position.

8. In a composite cylinder head, a wall, a cylindrical extension integral with the wall, said wall and extension having a bore through the wall and into that part of the extension closest to the wall, said extension having a substantially radial side opening exterior of said wall and communicating with said bore, and an annular belt member embracing said extension having a substantially radial bore registering with the side opening of said extension.

9. In a composite cylinder head, a wall, a cylindrical extension integral with the wall, said wall and extension having a bore through the wall and into that part of the extension closest to the wall, said extension having a substantially radial side opening exterior of said wall and communicating with said bore, an annular belt member embracing said extension having a substantially radial bore registering with the side opening of said extension, and means overlapping the outer end of said belt secured to the outer end of said extension.

10. In combination, an engine cylinder, a cylinder head thereon having a valve seat and an integral extension beyond the valve seat, said valve seat defining an opening into the cylinder and said extension having a lateral arcuate opening communicating with the valve seat opening, and an annular member embracing said extension, defining with said lateral opening a port cavity, said member having an opening communicating with said cavity.

11. A composite cylinder head including a main dome member, an integral cylindrical projection thereon, said projection having a lateral arcuate port formed therein and said head having a valve seat opening communicating with said port, and an annular belt member embracing said extension and defining with said port, a port cavity, said belt member having a lateral opening in communication with said cavity.

12. The combination with a cylinder head having a ported cylindrical extension, of a port belt member embracing the extension and fitted thereto, said member having a conduit connection communicating with the interior of said head through said ported extension.

ROLAND CHILTON.